INVENTOR.
Robert W. Saumsiegle
BY Robert P. Churchill
ATTORNEY

INVENTOR.
Robert W. Saumsiegle
BY Robert R. Churchill
ATTORNEY

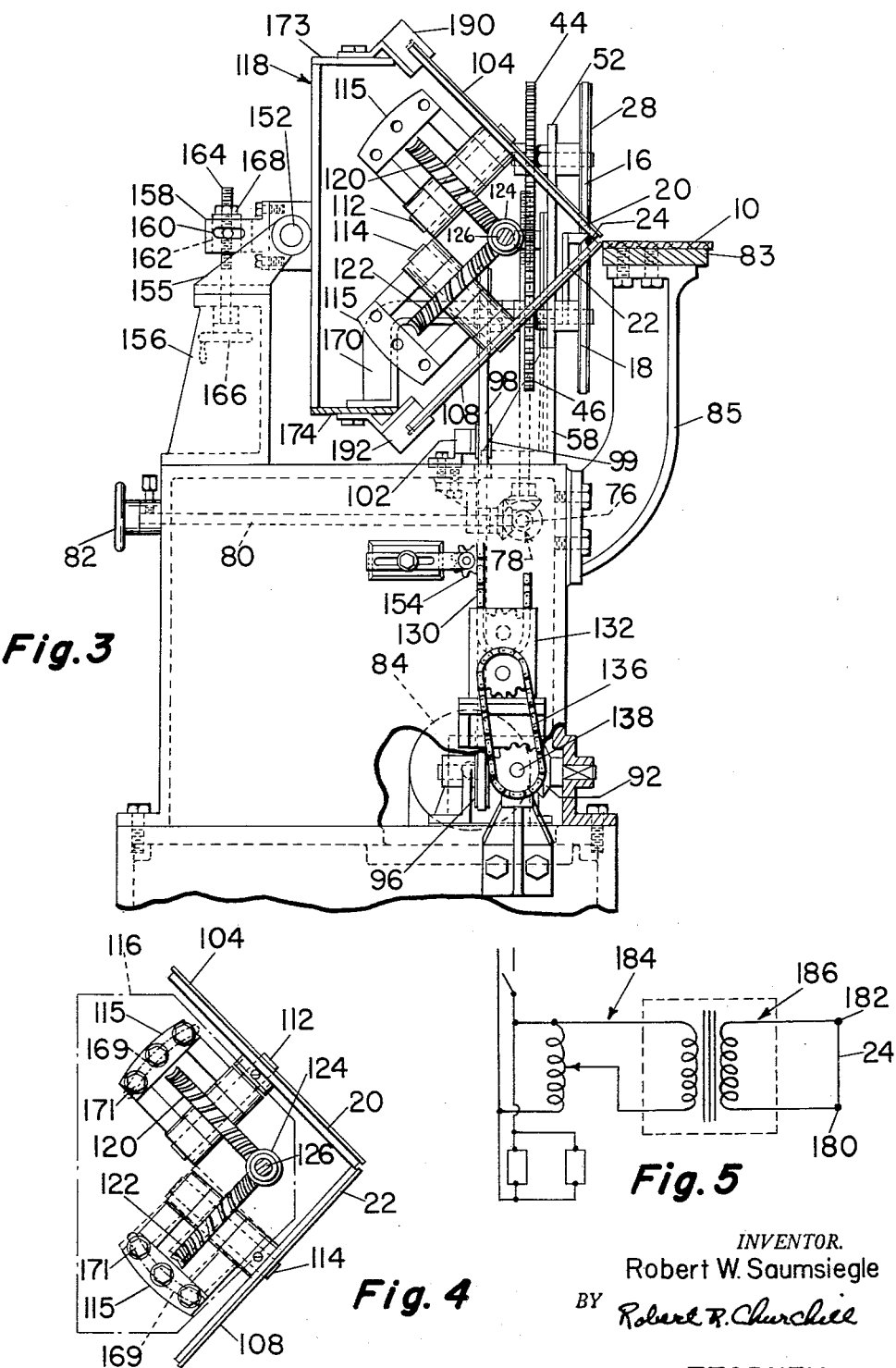

Jan. 9, 1962 R. W. SAUMSIEGLE 3,015,920
METHOD AND APPARATUS FOR TRIMMING
AND SEALING PLASTIC BAGS
Filed Nov. 29, 1957 6 Sheets-Sheet 4

INVENTOR.
Robert W. Saumsiegle
BY Robert R. Churchill
ATTORNEY

Jan. 9, 1962   R. W. SAUMSIEGLE   3,015,920
METHOD AND APPARATUS FOR TRIMMING
AND SEALING PLASTIC BAGS
Filed Nov. 29, 1957   6 Sheets-Sheet 5
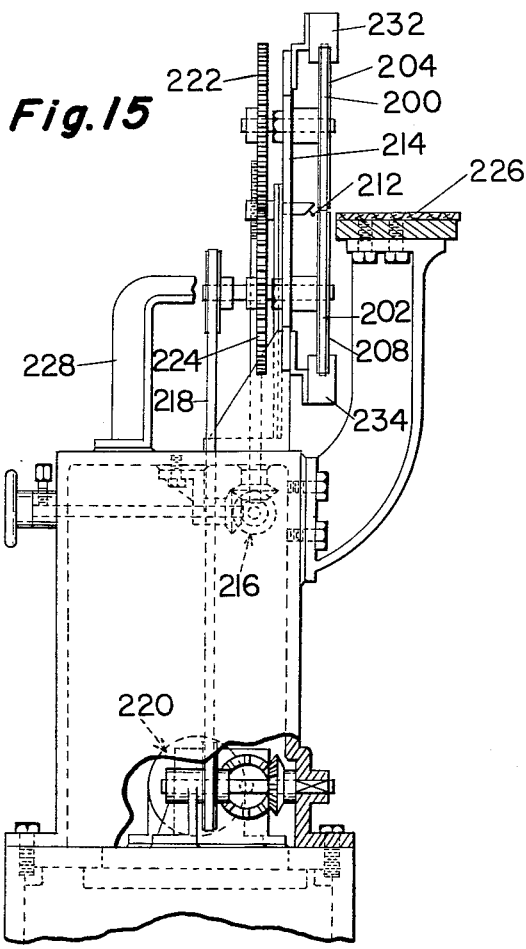
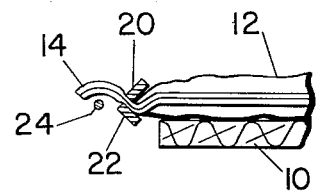
Fig. 10
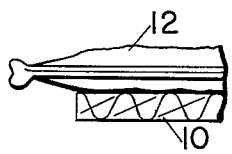
Fig. 12
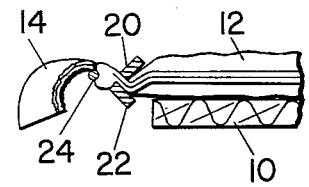
Fig. 11
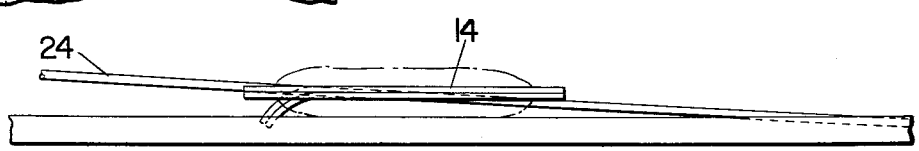
Fig. 14
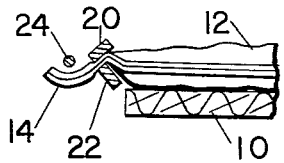
Fig. 13
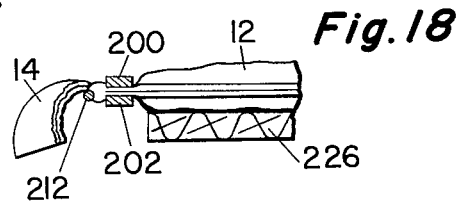
Fig. 18
INVENTOR.
Robert W. Saumsiegle
BY Robert R. Churchill
ATTORNEY INVENTOR.
Robert W. Saumsiegle
BY Robert R. Churchill
ATTORNEY United States Patent Office 3,015,920
Patented Jan. 9, 1962

3,015,920
METHOD AND APPARATUS FOR TRIMMING AND SEALING PLASTIC BAGS
Robert W. Saumsiegle, Lexington, Mass., assignor, by mesne assignments, to Pneumatic Scale Corporation, Limited, Quincy, Mass., a corporation of Massachusetts
Filed Nov. 29, 1957, Ser. No. 699,630
22 Claims. (Cl. 53—44)

This invention relates to a method of and apparatus for trimming and sealing the mouth portions of plastic bags.

The invention has for an object to provide novel and improved apparatus embodying a heated element for trimming and sealing the extended mouth portions of a flat sheet plastic bag in a rapid, economical and efficient manner.

A further object of the invention is to provide a novel and improved method of trimming and sealing the mouth portions of plastic bags by liquefication and fusing in a rapid, economical and practical manner.

With these general objects in view and such others as may hereinafter appear, the invention consists in the method of and apparatus for trimming and sealing plastic bags and in the various structures, arrangements and combinations of parts hereinafter described and particularly defined in the claims at the end of this specification.

In the drawings illustrating the preferred embodiment of the invention:

FIG. 3 is an end view of the apparatus as seen from the left in FIG. 1;

FIG. 4 is a detail view of a portion of the machine shown in FIG. 3 illustrating an adjustment feature;

FIG. 5 is a wiring diagram to be referred to;

FIG. 6 is a view similar to FIG. 5 showing a modified wiring diagram to be referred to;

Figure 7:
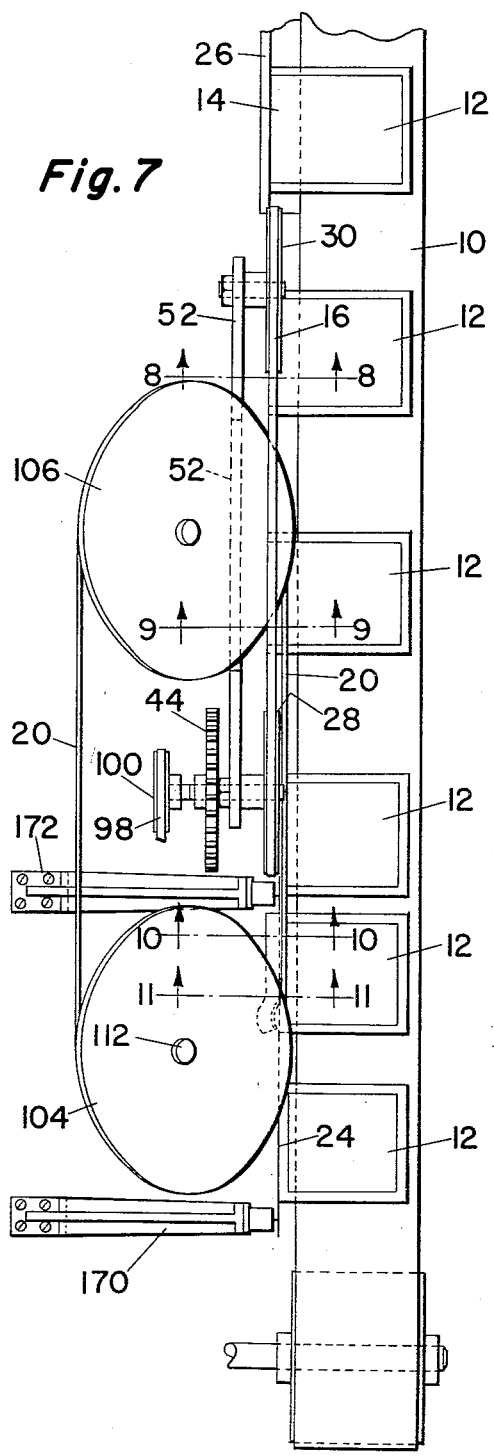
Figure 16:
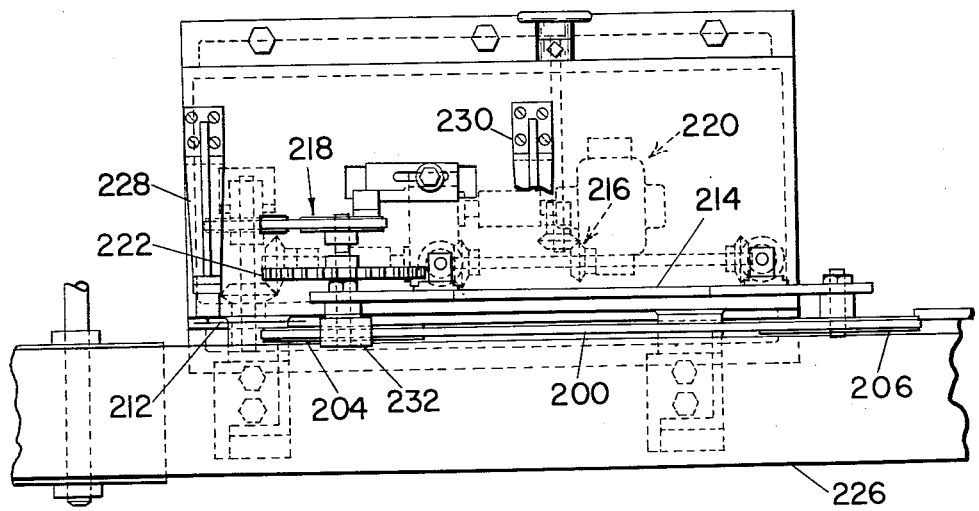
Figure 17:
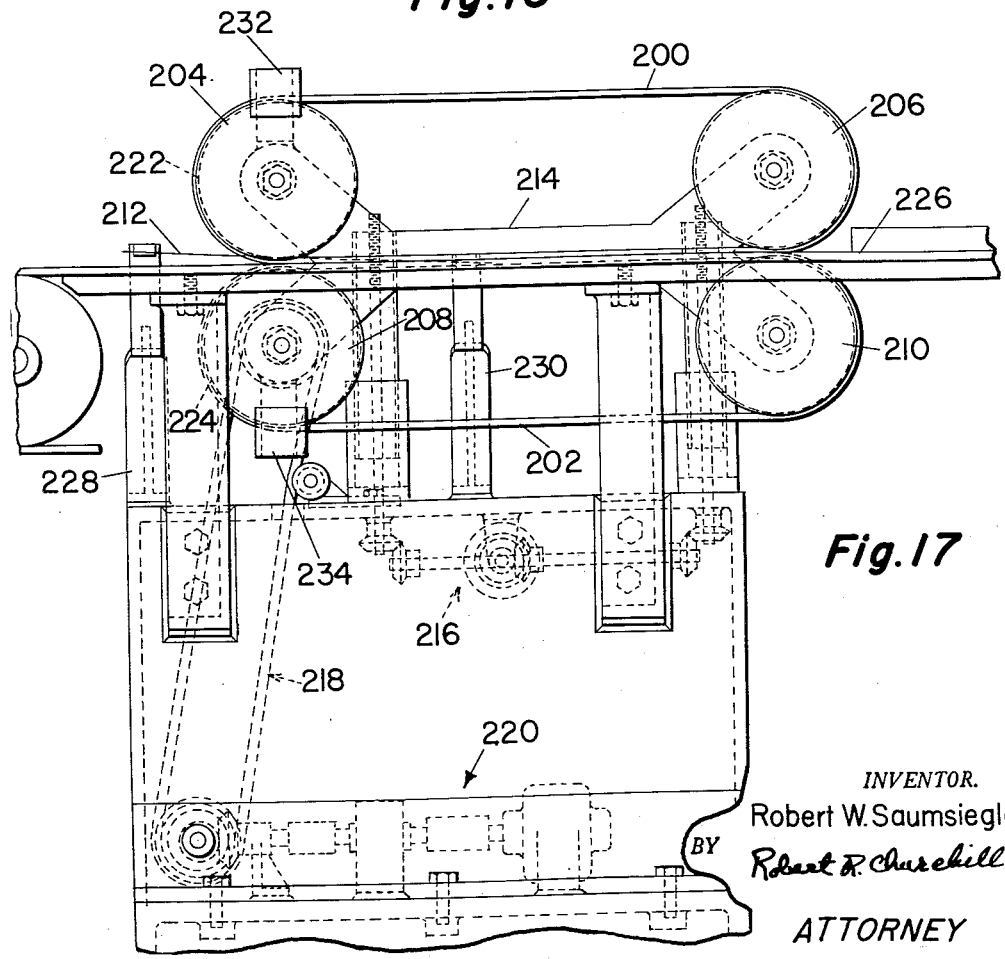

FIG. 7 is a plan view of a portion of the machine showing the conveyer and the articles supported thereon in operative relation to the trimming and sealing mechanism FIGS. 8, 9, 10, and 11 are enlarged detail views in vertical cross section taken on the lines 8—8, 9—9, 10—10 and 11—11 of FIG. 7 illustrating the manner of gripping, trimming and simultaneously sealing the mouth portion of the plastic bag;

FIG. 12 is a detail view of the trimmed and sealed mouth of the bag;

FIG. 13 is a view similar to FIG. 10 showing the mouth gripping elements in a different position of adjustment;

FIG. 14 is a front elevation detail view illustrating the angle of intersection of the mouth portion with the heated trimming and sealing element;

FIG. 15 is an end view of a modified form of bag mouth trimming and sealing machine embodying the present invention;

FIGS. 16 and 17 are plan and front elevation views respectively of the modified form of machine shown in FIG. 15; and FIG. 18 is a detail view partly in cross section illustrating the mouth gripping elements in the modified machine.

In general the present invention contemplates a method of and apparatus for trimming and sealing the mouth portion of a flat, rectangular sheet plastic bag containing an article of merchandise. The flat plastic bag may be provided with opposed wall portions closed on three sides and having an open mouth portion, and the bag material may comprise a polyethylene sheet material or like plastic sheet material capable of liquefication and fusion when subjected to heat. In accordance with the present invention after the bag is filled with the merchandise it is placed on a conveyer with the open mouth portion extended laterally over one side thereof. The mouth portion may then be engaged by opposed continuously moving gripping elements in the form of opposed upper and lower metal belts arranged to clamp the walls of the mouth portion together to close the mouth along a line which may be spaced a relatively short distance from the edge of the merchandise contained in the bag leaving a substantial portion of the mouth extended beyond the line of contact of the metal belts. Thereafter, a stationary heated wire arranged in the path of the extended mouth portion and cooperating with the metal supporting and gripping belts effects melting of the extended mouth portion and trimming of the same along a line spaced a short distance from the metal belts wherein removal of the extended mouth portion is effected by liquefication of the polyethylene bag material along the trim line. Concurrently with the trimming action, the melting of the material along the trim line effects fusion of the opposed walls of the mouth portion between the trim line and the gripping belts to thereby seal the bag. In the illustrated embodiment of the invention, the metal gripping belts are preferably arranged at an angle with relation to each other and with relation to the mouth of the bag so that the edges of the upper end lower belts cooperate to close the mouth along a relatively narrow line, and the angularly extended portions of the belts provide a barrier to prevent heating and blistering of the plastic material beyond the gripped portion.

In the preferred embodiment of the invention provision is made for first engaging the mouth portion of the bag between opposed upper and lower flat belts for the purpose of flattening and smoothing the opposed walls of the mouth into contact relation whereby to assure positive engagement of the opposed wall portions in a flat condition by the metal belts. In a modified form of the invention the preliminary smoothing belts may be dispensed with and flat opposed metal belts may serve to smooth and grip opposed walls of the mouth portion and to advance the same into contact with the heated wire to effect trimming and fusion of the bag mouth as described.

Figure 1:
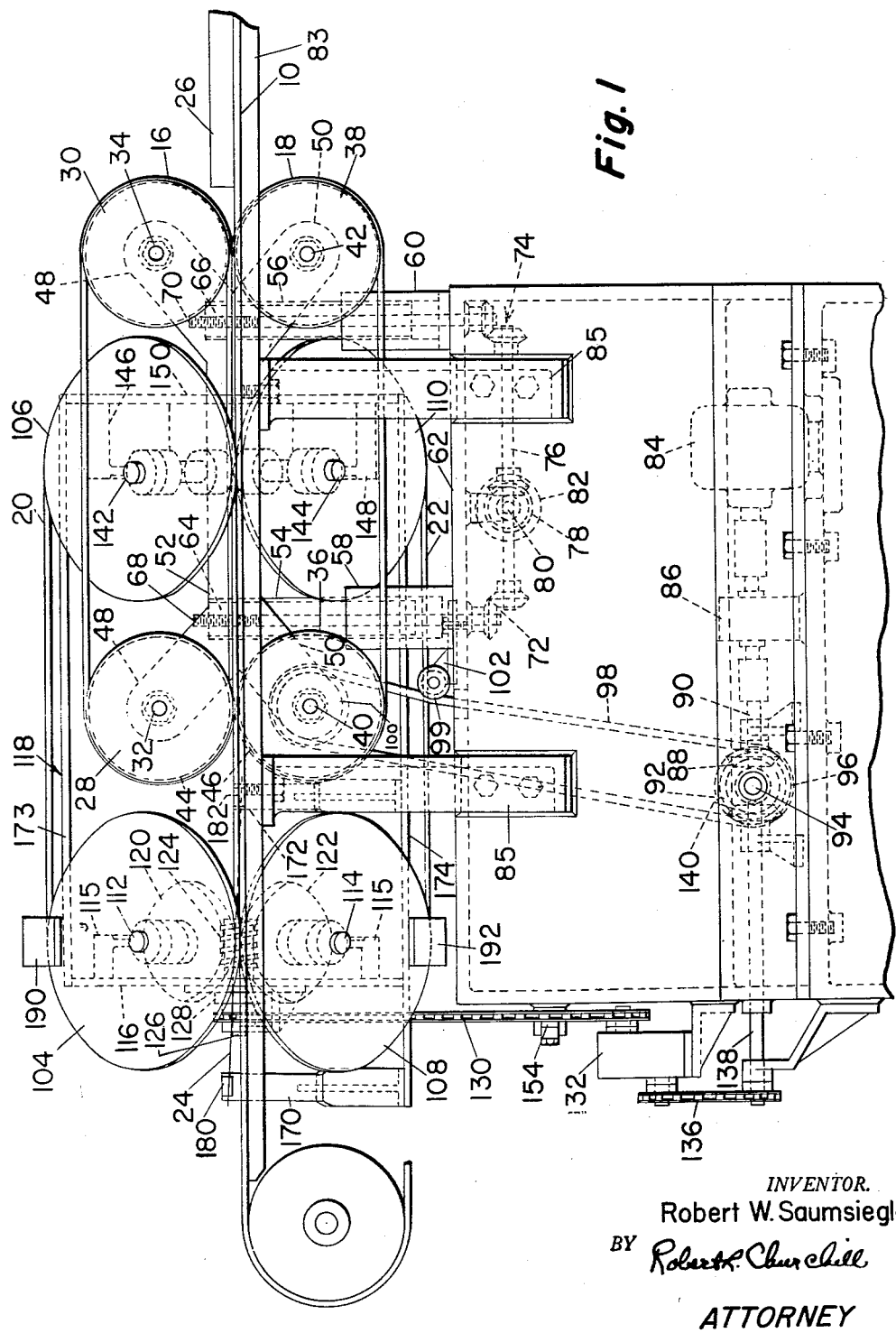
FIG. 1 is a front elevation of apparatus embodying the present invention.
Figure 2:
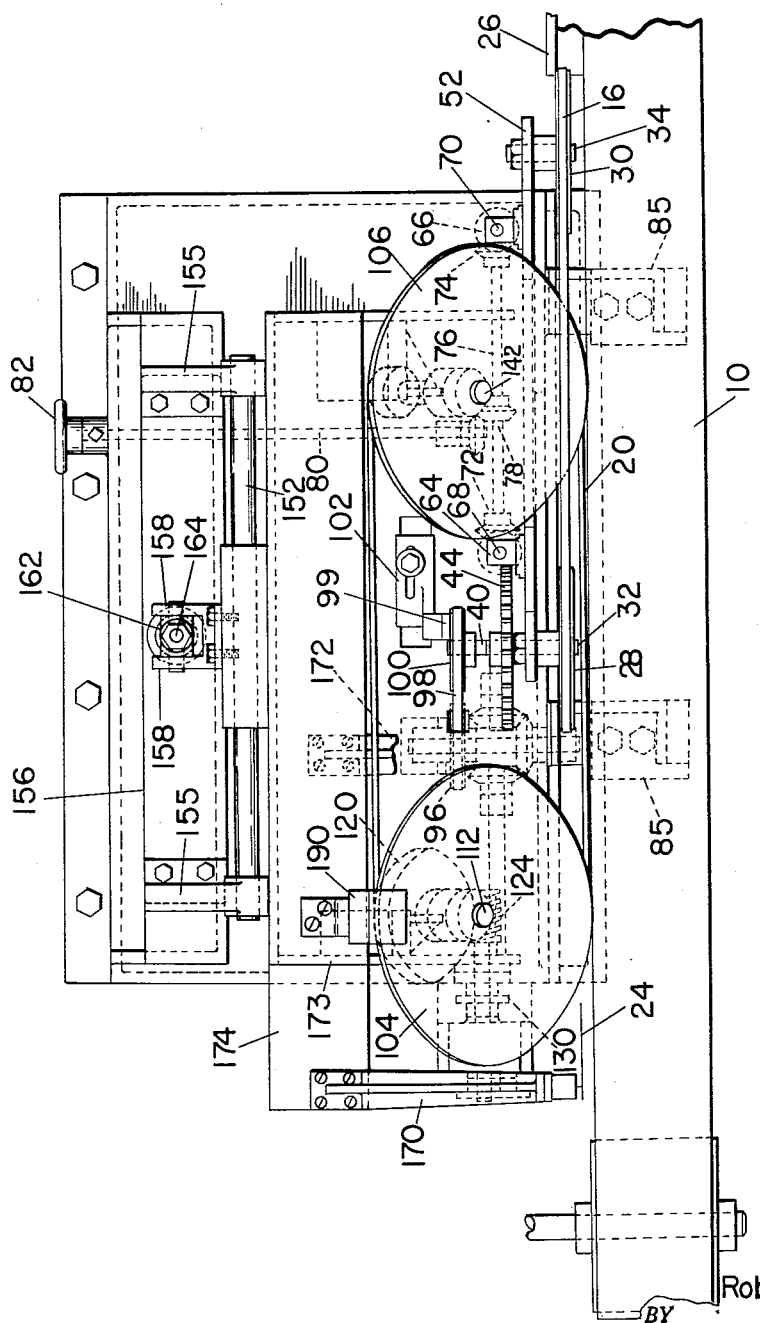
FIG. 2 is a plan view of the apparatus shown in FIG. 1.

Referring now to the drawings, in general the present bag trimming and sealing apparatus, as illustrated in FIGS. 1, 2 and 3, is embodied in a machine which includes a continuously moving conveyer belt 10 for supporting and continuously advancing flat plastic bags 12. The mouth portion 14 of the bags are first engaged by opposed upper and lower flat belts 16, 18 for the purpose of bringing the opposed walls of the mouth together in substantially flat face to face contacting engagement. The flattened mouth portion is then presented between opposed upper and lower metal belts 20, 22 which are arranged at an angle with relation to each other and with relation to the plane of the mouth portion of the bag so that the contacting edges of the belts 20, 22 cooperate to engage the mouth along a relatively narrow line of contact. While thus gripped between the metal belts, the mouth portion is advanced into engagement with a heated wire 24 to effect trimming of the extended portion of the mouth and sealing of the mouth by liquefication and fusion of the plastic bag material.

The continuously moving conveyer belt 10 may be continuously driven in any usual or preferred manner, not shown, and the flat plastic bags 12, which may contain an article of merchandise, such as an article of clothing, are placed flat or horizontally on the conveyer with the open mouth portions 14 thereof extended laterally beyond one edge of the conveyer in longitudinal alignment with the opposed mouth closing belts 16, 18. In practice some of the articles of merchandise being packaged may more fully fill the bag than other articles so as to present the outer edge of the article closer to or further away from the mouth portion. In order to align the mouth portion with the bag closing belts 16, 18 as close as practical to the outer edge of the merchandise, the front edge or mouth of the bag may be placed against a stop or guide member 26 supported adjacent one side of the conveyor 10 as shown. The guide member 26 may be adjusted laterally to accommodate different length bags and bags in which the outer edge of the merchandise may vary in distance relative to the outer edge of the mouth portion.

The opposed upper and lower belts 16, 18 may comprise relatively narrow, flat and longitudinally extended endless belts, the upper belt 16 being arranged to run over end pulleys 28, 30 carried on shafts 32, 34 and the lower belt 18 being arranged to run over end pulleys 36, 38 carried by shafts 40, 42. The pulleys 28, 36 may comprise drive pulleys fast on their respective shafts 32, 40 and connected to rotate in opposite directions by spur gears 44, 46, the idler pulleys 30, 38 being mounted to rotate on their respective shafts 34, 42. The shafts 32, 34 and 40, 42 are carried by and extended from diverging arms 48, 50 at each end of a horizontally extended bracket 52.

As herein shown, the bracket 52 is mounted for vertical adjustment. In practice the bags may contain articles of varying thickness so that the opposed walls of the mouth portion of the bag may be spread apart in varying distances. The expedient of mounting the pulley supporting bracket 52 for vertical adjustment enables the belts 16, 18 to be presented relative to the mouth portion so as to bring each of the opposed spread apart walls of the mouth portion together equal distances toward the center line of the bag such that the closed mouth portion is positioned along the horizontal center line equidistant from the top and bottom of the thickness of the article being packaged. As illustrated in FIG. 1, the bracket 52 may be secured to spaced upright supporting members 54, 56 mounted for vertical adjustment in brackets 58, 60 attached to the platen 62 of the machine frame. The upper ends of the upright members 54, 56 may be provided with threaded blocks 64, 66 secured thereto and through which vertical elongated threaded rods 68, 70 extend. The lower ends of the rods are journaled in and extend through the platen 62 and are connected by bevel gears 72, 74 to a horizontal shaft 76. The shaft 76 is in turn connected by bevel gears 78 to an elongated manually rotated adjusting rod 80 extended through a side wall of the frame and provided at its outer end with a hand wheel 82. In operation when a run of bags containing articles of a particular thickness are placed on the conveyer 10 of a fixed height, the hand wheel 82 may be rotated to present the belts in alignment with the horizontal center line of the bag as described. As herein shown, the conveyer belt 10 may run over a backing plate 83 supported by brackets 85 attached to the machine frame.

The belts 16, 18 may comprise leather or like material possessing sufficient rigidity to press the opposed walls of the mouth portion in flat contacting relation, as described, and provision is made for driving the belts at a linear speed equal to the speed of advance of the bags on the conveyer 10 through driving mechanism shown in FIGS. 1 to 3. The driving mechanism includes a driving motor 84 connected through a speed reducer 86 to a bevel gear 88 on a shaft 90 in mesh with a bevel gear 92 on a shaft 94. The shaft 94 is provided with a pulley 96 connected by a belt 98 to a pulley 100 fast on the lower drive pulley shaft 40 which is connected to the upper drive shaft 32 by the spur gears 44, 46 as described. In order to permit vertical adjustment of the belt supporting unit a belt tightener comprising an idler pulley 99 is arranged to cooperate with the drive belt 98. The idler pulley may be carried by a slotted bracket 102 adjustably mounted and supported from the frame.

After the mouth portion is closed by the belts 16, 18, the flattened mouth is received between the angularly arranged upper and lower metal belts 20, 22. As illustrated in FIG. 1, the metal belts initially engage the mouth portion at a point intermediate the length of the engaging run of the mouth flattening belts 16, 18 so that both sets of belts are in engagement with the mouth for the remaining length of the run of the belts 16, 18. The metal belts 20, 22 extend beyond the flattening belts, as shown, so that when the bag mouth is subsequently engaged by the heated wire 24 it will be gripped between the metal belts only.

As herein illustrated, each metal belt is disposed at an angle of about 45° with respect to the horizontal plane of the mouth portion of the bag and at an angle of about 90° with respect to each other, so that the upper and lower faces of the mouth portion are engaged by the cooperating longitudinal edges of the upper and lower metal belts 20, 22, respectively. The upper and lower metal belts 20, 22 may be arranged so that the cooperating marginal edges form a V and provide a relatively thin line contact with opposed walls of the mouth as illustrated in FIG. 1. However, in the preferred embodiment of the invention, as shown in FIG. 4, the upper and lower belts are preferably offset relative to each other, as also shown in FIG. 10 so that the thin or narrow edge of one belt may engage the marginal edge of the wide face of its cooperating belt. Thus, the bag mouth is gripped along a relatively narrow line equal to the thickness of the belt. Such offset relation may be arranged so that the gripped portion of the mouth extends at an upwardly inclined angle, as shown in detail in FIG. 10, or so that the gripped portion extends at a downwardly inclined angle as shown in FIG. 13. In any event, the upper and lower angularly extended wide faces of the belts extend over and under the adjacent portions of the inner edge of the bag mouth, respectively, to form a barrier to prevent excessive heating by the heated wire 24 during the subsequent trimming and sealing operation. The relatively narrow line contact preferably occurs along a line spaced a short distance inwardly from the portion of the mouth engaged between the flattening belts and closer to the edge of the article contained in the bag whereby to confine the article closely within the bag. The metal belts 20, 22 are arranged to run over upper and lower pulleys 104, 106 and 108, 110, respectively, which are mounted on axes arranged at an angle of 45° as shown. The belts 20, 22 are also arranged to travel at a linear speed equal to the advance of the containers on the belt 10 and, as herein shown, the drive pulleys 104, 108 are mounted fast on shafts 112, 114, respectively, journaled in brackets 115 carried by the wall 116 of a frame member 118. Each shaft 112, 114 is provided with a worm gear 120, 122, each of which is in mesh with a worm 124 fast on a shaft 126 journaled in a bearing member 128 secured to the wall 116. The worm 124 is arranged to be rotated through connections including a chain and sprocket drive 130 between the shaft 126 and the output shaft of a speed increasing unit 132. A second chain and sprocket drive 136 connects the input shaft of the speed increasing unit to a drive shaft 138. The drive shaft 138 is provided with a bevel gear 140 in mesh with the bevel gear 92 forming a part of the main drive mechanism as described.

The upper and lower pulleys 106, 110 which are also mounted on axes arranged at an angle of 45°, as shown, are arranged to rotate on shafts 142, 144, respectively, which are journaled in brackets 146, 148 attached to a second wall 150 of the frame member 118. The frame member 118 carrying the metal belts and their driving elements is mounted to be adjustably rocked on a shaft 152 to enable substantially vertical adjustment of the engaging portions of the belts 20, 22 relative to the mouth portion whereby to effect alignment of the belts with the horizontal center line of the thickness of the article contained in the bag and to conform to the vertical adjustment of the belts 16, 18 as described. A suitable chain take-up idler sprocket 154 may be provided for the chain and sprocket drive 130 which may be adjusted to conform to the adjusted position of the frame unit 118. As herein shown, the shaft 152 may be journaled in bearing brackets 155 supported on a bracket 156 attached to the machine frame. The frame unit 118 is provided with rearwardly extended spaced ears 158 having horizontal slotted openings 160. A block 162 fitted between the spaced ears is provided with laterally extended pins which are received in the slotted openings 160. The block 162 is provided with a central threaded opening through which a threaded adjusting rod 164 extends. The lower end of the rod 164 is journaled in a portion of the bracket 156 and provided with a hand wheel 166. Thus, in operation rotation of the hand wheel will effect upward or downward rocking of the frame member 118 and the driving unit carried thereby to present the metal belts at the horizontal level required. A nut and washer 168 may be provided at the uper end of the rod 164 for locking the unit in its adjusted position.

As illustrated in FIG. 4, provision is also made for adjusting the angularity of the pulleys 104, 108 relative to each other so as to provide either edge-to-edge contact or edge-to-face contact of the belts 20, 22. The side wall 116 of the frame unit 118 to which the brackets 115 are attached may be provided with arcuate slotted portions 169, as shown, so that the brackets 115 and the worm gears 120, 122 may be adjusted radially with respect to the worm 124 and worm shaft 126 to dispose the edges of the pulleys 104, 108 in the desired angular relationship, the brackets being secured in their adjusted position by bolts 171. It will be observed that the side wall 116 is shown in dot and dash lines in FIG. 4 and is left out entirely in FIG. 3 in order to show the driving gears and the brackets in full lines. Such adjustment also permits slight variations in spacing between the upper and lower belts to provide sufficient gripping pressure between the metal belts 20, 22 and also to accommodate mouth portions of various thicknesses. A similar adjusting mechanism may be provided for the brackets 146, 148 supporting the idle pulleys 106, 110 respectively.

From the description thus far it will be observed that successive bags placed on the conveyor 10 are advanced to present the mouth portions thereof between the opposed upper and lower mouth flattening and closing belts 16, 18, and while thus held and advanced, the mouth portions are engaged between opposed upper and lower angularly arranged metal belts 20, 22 along a line spaced a short distance inwardly of the mouth portion relative to the line of engagement of the flattening belts. In practice it was found that the initial supporting engagement of the mouth portion by the belts 16, 18 enabled the subsequent engagement of the angularly arranged metal belts 20, 22 to maintain a straight line contact with the mouth portion. Without the support of the belts 16, 18 during initial engagement of the metal belts there was a tendency for the line to deviate from a straight path and to follow a curved or bowed path due to the angular arrangement of the metal belt pulleys.

Thereafter, when the bag mouth leaves the belts 16, 18 and is supported between the extended portions of the metal belts 20, 22 only, the leading edge of the bag mouth is advanced into intersecting engagement with the heated wire 24 to effect the trimming and sealing operation. As herein shown, the relatively stationary trimming wire 24 is extended between spaced upright posts 170, 172 mounted on and movable with a lower wall 174 of the adjustable frame unit 118. The wire 24, as shown, may and preferably will extend longitudinally of the mouth and at an angle of about two degrees relative to the horizontal plane of the mouth portion supported between the metal belts. The longitudinally and angularly extended wire 24 may be spaced a relatively short distance from the edge of the metal belts 20, 22, and in the embodiment of the invention shown in FIG. 1, the angular disposition of the wire extends from a position below the plane of the mouth portion on post 172 to a position above the plane of the mouth portion on post 170 so that in operation the leading edge of the mouth portion is first advanced above the wire to engage the same at an intermediate portion thereof. During the continuous advance of the bags with the extended mouth portions in engagement with the wire, which is heated to a temperature sufficient to melt and liquefy the material forming the bag, a path is melted through the mouth portion to effect the trimming operation and concurrently therewith, the heat of the wire effects fusion of the edges of the mouth portion gripped between the angularly arranged metal belts 20, 22. The surplus material trimmed from the mouth portion may be guided into a container, not shown.

The disposition of the heated wire 24 at a relatively small incline with respect to the horizontal plane of the bag mouth, as shown in FIG. 1, at an upwardly inclined angle of approximately two degrees with respect thereto, comprises an important feature of the present invention which assures contact of the mouth portion with a sufficiently hot portion of the wire at all times to effect continuous trimming operations on successive bags. In contradistinction thereto, if the hot wire were disposed at 90° or vertically with respect to the horizontal plane of the mouth portion, the relatively small portion of the wire continuously engaged by successive bags would quickly cool below a temperature sufficient to melt the plastic material. In the operation of the illustrated machine wherein the wire 24 is arranged longitudinally of and at a slight upwardly inclined angle with respect to the horizontal plane of advance of the bag, as illustrated in detail in FIG. 14, it will be observed that in the event the initially engaged portion of the wire becomes cooled below the temperature required for efficient melting of the plastic material, the mouth portion will tend to ride up on the angularly arranged wire to engage a hotter portion thereof forward of the initially engaged portion to perform the continuous melting and trimming operation. After a short time the initially cooled portion of the wire will again become heated sufficiently to perform the trimming operation while the forward portion of the wire is afforded time to become heated. Thus, a relatively long intersecting portion of the heated wire is made use of to effect the trimming operation to assure that a sufficiently hot portion of the wire is engaged by the mouth portion at all times to effect continuous trimming and sealing of successive bag mouths. It will also be observed that the mouth portion, prior to arriving at the point of intersection of the wire and path of travel of the bag, overlies the hot wire 24 in relatively close proximity thereto so that in operation the mouth portion becomes in effect preheated and softened to some extent along the trim line so as to facilitate the liquefication and trimming of the mouth portion when it arrives at the point of intersection with the hot wire. In practice it has been found that the angle of intersection of the wire with the mouth may vary between one and three degrees for good results, although greater angles of intersection may be found of advantage in some instances.

Figure 6:
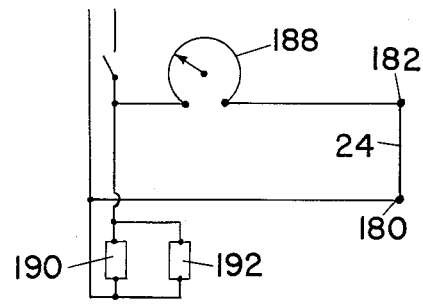
Figure 8:
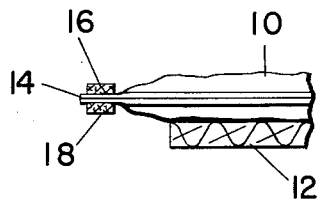
Figure 9:
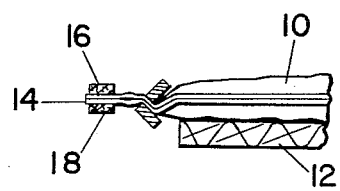

The heated wire 24 supported between the upright posts 170, 172 may be connected at each end to contacts 180, 182 supported by the posts and which form part of a heating circuit, diagrammatically illustrated in FIG. 5, which may include a variable voltage input auto-transformer 184, and a conventional transformer 186, for controlling the temperature of the wire 24. A modified form of heating circuit, shown in FIG. 6, may include a rheostat 188, for controlling the heat of the wire.

In operation some of the melted plastic material may be accumulated on the belts 20, 22 and be transferred to the drive pulleys 104, 108. In order to maintain the pulleys 104, 108 and the belts clear of such accumulated plastic material stationary upper and lower heating members 190, 192, respectively, are provided which are arranged to cooperate with and embrace the edges of the pulleys, as shown in FIG. 3, to effect a melting and wiping action along the engaged portions of the pulleys and the belts. As herein shown, the heating members 190, 192 are mounted on the upper and lower wall members 173, 174 of the adjustable frame member 118 and may form part of the circuit illustrated in FIG. 5, or of the modified circuit shown in FIG. 6.

In a modified form of the invention it may be preferred to dispose the heated wire at a downwardly inclined angle with respect to the horizontal plane of the mouth portion, the remainder of the machine being similar to the machine shown in FIG. 3. In such event, it may be preferred to adjust the offset relation of the belts to extend the mouth portion in an angular position, such as to accommodate the reversed angular position of the wire 24, the two positions of adjustment being shown in FIGS. 10 and 12, respectively. In operation when the initially engaged portion of the wire becomes cooled, the mouth portion will be forced downwardly along the wire to engage a sufficiently heated portion to effect melting of the material. In this manner a sufficiently heated portion of the wire is always available to perform the continuous trimming and fusing operation as described.

Referring now to FIGS. 15, 16 and 17, in a further modified form of the present invention the preliminary mouth flattening belts may be eliminated and the flattening and gripping of the mouth portion may be performed by a single pair of opposed cooperating metal belts comprising an upper belt 200 and a lower belt 202 which run over pulleys 204, 206 and 208, 210, respectively, mounted to rotate on horizontal axes so that the belts 200, 202 present their flat faces against the mouth portion as illustrated in detail in FIG. 18. In the modified form of the invention the heated wire 212 spaced a short distance from the outer edges of the belts may be supported at a slight angle, approximately two degrees, relative to the horizontal plane of the mouth portion supported between the belts 200, 202 in a manner similar to that described with relation to the embodiment shown in FIG. 3, and in operation the wire effects melting of the mouth portion to effect trimming thereof and fusion of the mouth walls in the area between the wire and the adjacent gripping edges of the belts 200, 202. The pulleys may be supported in a bracket 214 mounted for vertical adjustment through the connections indicated at 216 which may comprise the manually adjustable means previously described with respect to the embodiment shown in FIG. 1. The drive to the pulleys 204, 208 may also be similar to the previously described embodiment and includes a belt and pulley drive 218 from the main power source indicated at 220. The drive also includes the intermeshing spur gears 222, 224 connecting the pulleys in driving relation, the linear speed of the belts being equal to the advance of the bags on the conveyer belt 226. The heated wire 212 may be connected between posts 228, 230, and the pulleys 204, 208 may be provided with heated wipers 232, 234 for the purpose defined, the wire and the wipers being included in a circuit similar to those shown in FIGS. 5 and 6.

From the above description it will be observed that the present invention provides a novel method of and apparatus for trimming and sealing the mouth portions of plastic bags by the application of heat to effect liquefication of the plastic material along the trim line and, concurrently therewith, to effect fusion of the edges of the mouth portion to seal the bag.

While the preferred embodiment of the invention has been herein illustrated and described, it will be understood that the invention may be embodied in other forms within the scope of the following claims.

Having thus described the invention, what is claimed is:

1. Apparatus for trimming and sealing the mouth portion of a plastic bag comprising continuously moving means for gripping and supporting opposed walls of the mouth portion in closed relation along a line spaced from the outer edge of the mouth leaving an extended portion, and a heated element spaced a short distance outwardly from said gripping means and arranged to intersect the extended mouth portion for liquefying the plastic material of the extended mouth portion along a line spaced from the outer edge of the extended mouth portion and adjacent said gripping means to effect simultaneous trimming of said extended portion and fusion of opposed walls adjacent the gripped portion to seal the mouth.

2. Apparatus for trimming and sealing the mouth portion of a plastic bag comprising means for supporting and continuously advancing the bag, means movable with the bag for gripping and maintaining opposed walls of the mouth portion in closed relation along a line spaced from the outer edge of the mouth leaving an extended portion, and a stationary heated element spaced a short distance outwardly from said gripping means and disposed in the path of the mouth portion for liquefying the plastic material of the extended mouth portion along a line spaced from the outer edge of the extended mouth portion adjacent said gripping means to effect simultaneous trimming of said extended portion and fusing of opposed walls adjacent the trim line to seal the mouth.

3. Apparatus for trimming and sealing the mouth portion of a flat plastic bag comprising means for supporting and continuously advancing the bag, continuously moving means comprising a pair of opposed cooperating metal belts for gripping and maintaining opposed walls of the mouth portion in closed relation along a line spaced from the outer edge of the mouth portion leaving an extended portion, and a stationary hot wire spaced a short distance outwardly from said belts and disposed in the path of the mouth portion and intersecting the same for liquefying the plastic material of the extended mouth portion along a line spaced from the outer edge of the extended mouth portion adjacent the engaging portions of said metal belts to effect simultaneous trimming of said extended portion and fusing of opposed walls adjacent the trim line to seal the mouth.

4. Apparatus for trimming and sealing the mouth portion of a plastic bag comprising means for supporting and continuously advancing the bag, continuously moving means comprising a pair of cooperating metal belts angularly arranged with respect to each other and with respect to the plane of the mouth portion so that the cooperating belts define a V shape in cross section for gripping and maintaining opposed walls of the mouth portion in closed relation along a line spaced inwardly from the outer edge of the mouth portion leaving an extended portion, said gripping line being defined by the engaging edges of the angularly arranged belts, and a stationary hot wire spaced a short distance outwardly from the engaging edges of said belts and disposed in the path of the mouth portion and intersecting the same for liquefying the plastic material along a line adjacent the engaging edges of said belts to effect trimming of said extended portion and fusing of opposed walls of the mouth portion adjacent the trim line to seal the mouth of the bag.

5. Apparatus as defined in claim 4 wherein the relatively thin edge of one angularly arranged metal belt is disposed to engage the marginal edge of the face of the second angularly arranged metal belt, such arrangement supporting the mouth portion of the bag at an angle with respect to the body of the bag.

6. Apparatus as defined in claim 4 wherein the angularly extended portions of the cooperating belts defining a V shape in cross section provide a barrier to prevent heating of the bag inwardly of the mouth beyond the engaging edges of the belts.

7. Apparatus for trimming and sealing the mouth portion of a flat plastic bag comprising means for supporting and continuously advancing the bag, continuously moving means comprising a pair of opposed cooperating metal belts for gripping and maintaining opposed walls of the mouth portion in closed relation along a line spaced from the outer edge of the mouth leaving an extended portion, and a stationary hot wire spaced a short distance outwardly from said belts and disposed in the path of the mouth portion and intersecting the same for liquefying the plastic material along a line adjacent the engaging portions of said metal belts and inwardly of the outer edge of the extended mouth portion to effect simultaneous trimming of said extended portion and fusing of opposed walls adjacent the trim line to seal the mouth, said hot wire being arranged longitudinally of and at a relatively small intersecting angle with respect to the plane of movement of the mouth portion whereby to dispose a relatively long portion of said wire in a position capable of intersecting engagement with the mouth portion so that in the event an initially intersected portion of said wire becomes cooled the bag mouth engages another and hotter intersecting portion of the wire to assure continuous trimming and sealing of the mouth portion.

8. Apparatus as defined in claim 7 wherein the intersecting arrangement of the longitudinally extended wire is such that the bag mouth passes in close proximity to the wire prior to reaching the point of intersection whereby to effect preheating and softening of the mouth along the trim line.

9. Apparatus for trimming and sealing the mouth portion of a plastic bag comprising means for supporting and continuously advancing the bag, continuously moving means comprising a pair of cooperating metal belts angularly arranged with respect to each other and with respect to the plane of the mouth portion so that the cooperating belts define a V shape in cross section for gripping and maintaining opposed walls of the mouth portion in closed relation along a line spaced inwardly from the outer edge of the mouth portion leaving an extended portion, said gripping line being defined by the engaging edges of the angularly arranged belts, a stationary heated wire spaced a short distance outwardly from said belts and disposed in the path of the mouth portion and intersecting the same for liquefying the plastic material along a line adjacent the engaging edges of said belts to effect simultaneous trimming of said extended portion and fusing of opposed walls of the mouth portion adjacent the trim line to seal the mouth of the bag, and continuously moving means preceding said opposed angularly arranged metal belts for initially gripping and smoothing opposed walls of the mouth portion and for supporting the same in closed relation until engaged between said angularly arranged metal belts.

10. Apparatus for trimming and sealing the mouth portion of a plastic bag comprising means for supporting and continuously advancing the bag horizontally with the mouth portion extended laterally, a pair of opposed upper and lower cooperating metal belts for gripping and maintaining opposed walls of the mouth portion in closed relation along a line spaced from the outer edge of the mouth leaving an extended portion, and a stationary hot wire spaced a short distance outwardly from said belts and disposed in the path of the mouth portion and intersecting the same along a line adjacent the cooperating edges of said metal belts and inwardly of the outer edge of the mouth portion for liquefying the plastic material to effect simultaneous trimming of said extended portion and fusing of said opposed walls between the trim line and the edges of the metal belts to seal the mouth, said heated wire being arranged longitudinally of and at a relatively small intersecting angle in the order of one to three degrees in a vertical plane with respect to the horizontal plane of movement of the mouth portion.

11. In a machine for trimming and sealing the mouth portion of a plastic bag containing an article of merchandise, in combination, a conveyer for advancing plastic bags horizontally with the open mouth portions extended laterally, a pair of opposed upper and lower cooperating belts arranged to initially engage and bring together opposed spaced apart walls of the mouth portion equidistantly relative to the thickness of the merchandise to dispose the closure medially thereof, a pair of subsequently engaged opposed upper and lower cooperating metal belts angularly arranged with respect to each other and with respect to the horizontal plane of the closed mouth portion so that the upper and lower metal belts define a V shape in cross section for gripping and maintaining the mouth in closed relation along a line spaced inwardly from the outer edge of the bag and relatively close to the adjacent edge of the merchandise and leaving an extended mouth portion, said gripping line being defined by the engaging edges of the angularly arranged metal belts, and a stationary hot wire spaced a short distance outwardly from said belts and disposed in the path of and intersecting the mouth portion along a line adjacent the engaging edges of the metal belts for liquefying the plastic material along said line to effect trimming of the extended mouth portion and fusing of opposed walls between the trim line and the metal belts to seal the mouth.

12. A machine as defined in claim 11 wherein the hot wire is extended longitudinally of and at a relatively small angle in the order of one to three degrees in a vertical plane relative to the horizontal plane of the mouth portion to provide a relatively long portion capable of intersecting engagement with the mouth portion.

13. A machine as defined in claim 11 wherein the metal belts are arranged to run over pulleys, and heating elements cooperating with the pulleys adapted to melt and wipe substantially clean any plastic material accumulated on the pulleys and the belts passing thereover.

14. A machine as defined in claim 11 wherein the initial mouth engaging belts are each mounted for adjustment vertically toward and from each other and relative to the plane of the conveyer whereby to enable the belts to bring together opposed spaced apart walls equidistantly relative to articles of merchandise of varying thickness contained in the bag to provide said medial closure and wherein the metal belts are also supported to be adjusted vertically to conform to the medial closure line of the bag mouth.

15. A machine as defined in claim 14 wherein the metal belts are arranged to run over pulleys and wherein provision is made for adjusting the angular relationship of the pulleys relative to each other to vary the relationship of the marginal gripping edges of the belts and to adjust the gripping pressure.

16. Apparatus for trimming and sealing the mouth portion of a plastic bag comprising continuously moving means for gripping and closing the opposed walls of the mouth portion adjacent the marginal edge thereof, and a stationary hot wire spaced a short distance from said gripping means for liquefying the mouth portion inwardly of the marginal edge portion to effect simultaneous trimming of the edge and fusion of the opposed walls to seal the bag.

17. The method of trimming and sealing the mouth portions of plastic bags which comprises continuously advancing the bags, gripping the mouth portion along a line spaced inwardly from the outer edge of the mouth leaving an extended portion, and intersecting the extended mouth portion with a heated stationary hot wire element spaced a short distance outwardly from the gripped portion to effect liquefication of the plastic material and simultaneous trimming of the extended mouth portion along a line adjacent the gripped portion and inwardly of the outer edge of the mouth portion and to effect fusion of opposed walls of the mouth to seal the bag.

18. The method of trimming and sealing the mouth portions of flat plastic bags which comprises continuously advancing the bags; gripping and closing opposed walls of each bag mouth along a line spaced from the outer edge thereof leaving an extended portion; and intersecting the extended mouth portion with a hot wire along a line adjacent to and spaced a short distance outwardly from the gripped portion and inwardly of the outer edge of the mouth portion during the advance of the bags to effect liquefication and simultaneous trimming of the extended portion and fusing of opposed walls of the mouth adjacent the gripped portion to seal the mouth.

19. The method as defined in claim 18 wherein the bag is advanced longitudinally of the wire and at a relatively small angle of intersection in the order of one to three degrees in a plane at right angles to the direction of advance of the bag whereby the effective point of intersection varies in accordance with the variations in temperature along the wire, and whereby the mouth portion is advanced in close proximity to the wire prior to reaching the point of intersection to soften the plastic material along the trim line.

20. The method as defined in claim 18 wherein the bag contains an article of merchandise having thickness and which includes the step of initially closing together opposed walls of the mouth equidistantly relative to the thickness of the article.

21. The method of trimming and sealing the mouth portions of plastic bags which comprises continuously advancing the bags, gripping and closing the opposed walls of the mouth portion of each bag adjacent the marginal edge thereof, heating the mouth portion inwardly of the marginal edge thereof along a line spaced a short distance outwardly from the gripped portion to liquefy the bag material and to effect simultaneous trimming of the marginal edge and fusion of the opposed walls of the mouth portion to seal the bag.

22. In a machine for trimming and sealing the mouth portion of a plastic bag containing an article of merchandise, in combination, a conveyer for advancing plastic bags with the open mouth portions extending laterally, a pair of opposed upper and lower cooperating belts arranged to initially engage and bring together opposed spaced apart walls of the mouth portion equidistantly relative to the thickness of the merchandise to dispose the closure medially thereof, a pair of subsequently engaged opposed upper and lower cooperating metal belts angularly arranged with respect to each other and with respect to the horizontal plane of the closed mouth portion for gripping and maintaining the mouth in closed relation along a line spaced inwardly from the outer edge of the bag and relatively close to the adjacent edge of the merchandise and leaving an extended mouth portion, said gripping line being defined by the engaging edges of the angularly arranged metal belts, and a stationary heated wire disposed in the path of and intersecting the mouth portion along a line adjacent the engaging edges of the metal belts for liquefying the plastic material along said line to effect trimming of the extended mouth portion and fusing of opposed walls between the trim line and the metal belts to seal the mouth, said initial engaging belts supporting the mouth portion until it is engaged by the metal belts, said metal belts extending beyond the initial engaging belts for supporting the mouth portion during the trimming and sealing operations.

References Cited in the file of this patent

UNITED STATES PATENTS

| | | |
|---|---|---|
| 2,105,159 | Petskeyes | Jan. 11, 1938 |
| 2,356,472 | Rothaug | Aug. 22, 1944 |
| 2,459,235 | Hewitt et al. | Jan. 18, 1949 |
| 2,590,379 | Cloud | Mar. 25, 1952 |
| 2,606,850 | Piazze | Aug. 12, 1952 |
| 2,691,474 | Olson | Oct. 12, 1954 |
| 2,711,779 | Carland | June 28, 1955 |
| 2,732,881 | Anderle | Jan. 31, 1956 |
| 2,741,885 | Allison | Apr. 17, 1956 |
| 2,805,973 | Klasing et al. | Sept. 10, 1957 |
| 2,824,596 | Crawford | Feb. 25, 1958 |

FOREIGN PATENTS

| | | |
|---|---|---|
| 142,072 | Australia | July 9, 1951 |